US010012762B2

(12) United States Patent
Zhang et al.

(10) Patent No.: US 10,012,762 B2
(45) Date of Patent: Jul. 3, 2018

(54) STANDOFF DETERMINATION

(71) Applicant: Halliburton Energy Services, Inc., Houston, TX (US)

(72) Inventors: Zhijuan Zhang, Houston, TX (US); Weijun Guo, Houston, TX (US); Dongwon Lee, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 6 days.

(21) Appl. No.: 15/113,285

(22) PCT Filed: Dec. 3, 2015

(86) PCT No.: PCT/US2015/063693
§ 371 (c)(1),
(2) Date: Jul. 21, 2016

(87) PCT Pub. No.: WO2016/153566
PCT Pub. Date: Sep. 29, 2016

(65) Prior Publication Data
US 2017/0045640 A1  Feb. 16, 2017

Related U.S. Application Data

(63) Continuation-in-part of application No. PCT/US2015/022728, filed on Mar. 26, 2015, and a
(Continued)

(51) Int. Cl.
*G01D 18/00* (2006.01)
*G01V 11/00* (2006.01)
(Continued)

(52) U.S. Cl.
CPC ............ *G01V 11/002* (2013.01); *E21B 47/09* (2013.01); *E21B 47/14* (2013.01); *E21B 49/08* (2013.01);
(Continued)

(58) Field of Classification Search
CPC . H04N 5/33; G01J 5/522; A61B 6/583; G01T 1/40; G01D 18/00
See application file for complete search history.

(56) References Cited

U.S. PATENT DOCUMENTS 1,922,571 A    8/1933  Deline
4,462,082 A *  7/1984  Thiele .................... G01N 29/30
                                                          367/13
(Continued)

FOREIGN PATENT DOCUMENTS

EP    0159484 A1   10/1985
EP    1522848 A1    4/2005
(Continued)

OTHER PUBLICATIONS

"International Application Serial No. PCT/US2015/022729, International Search Report dated Dec. 18, 2015", 3 pgs.
(Continued)

*Primary Examiner* — David Porta
*Assistant Examiner* — Mamadou Faye
(74) *Attorney, Agent, or Firm* — Gilliam IP PLLC

(57) ABSTRACT

In some embodiments, methods, apparatus, and systems may operate to determine downhole tool standoff using a nuclear tool and photon activity, and to correct acoustic measurements using the standoff. Additional apparatus and systems, as well as methods, are disclosed, 20 Claims, 8 Drawing Sheets

Related U.S. Application Data continuation-in-part of application No. PCT/US2015/022729, filed on Mar. 26, 2015.

(51) Int. Cl.

| | |
|---|---|
| *E21B 47/09* | (2012.01) |
| *E21B 47/14* | (2006.01) |
| *G01V 1/48* | (2006.01) |
| *G01V 5/04* | (2006.01) |
| *G01V 1/40* | (2006.01) |
| *G01V 5/12* | (2006.01) |
| *E21B 49/08* | (2006.01) |
| *E21B 47/00* | (2012.01) |

(52) U.S. Cl.
CPC .................. *G01V 1/40* (2013.01); *G01V 1/48* (2013.01); *G01V 5/04* (2013.01); *G01V 5/12* (2013.01); *E21B 47/0005* (2013.01); *G01V 11/00* (2013.01)

(56) References Cited

U.S. PATENT DOCUMENTS

| | | | |
|---|---|---|---|
| 4,576,034 A | 3/1986 | Ferree et al. | |
| 5,451,779 A | 9/1995 | Spross et al. | |
| 5,486,695 A | 1/1996 | Schultz et al. | |
| 5,912,460 A | 6/1999 | Stoller et al. | |
| 7,587,936 B2 | 9/2009 | Wei | |
| 8,321,131 B2* | 11/2012 | Case | G01V 5/12 702/11 |
| 2007/0119243 A1 | 5/2007 | Smits et al. | |
| 2008/0186805 A1 | 8/2008 | Han | |
| 2009/0288820 A1 | 11/2009 | Barron et al. | |
| 2010/0076688 A1* | 3/2010 | Moake | E21B 47/08 702/8 |
| 2010/0270462 A1 | 10/2010 | Nelson et al. | |
| 2010/0314535 A1 | 12/2010 | Zhang et al. | |
| 2011/0029246 A1 | 2/2011 | Nikitin et al. | |
| 2011/0191027 A1 | 8/2011 | Pfutzner et al. | |
| 2011/0284732 A1* | 11/2011 | Korkin | E21B 47/0005 250/269.3 |
| 2012/0059587 A1* | 3/2012 | Marsh | G01V 5/06 702/8 |
| 2012/0138782 A1* | 6/2012 | Simon | G01V 5/125 250/254 |
| 2012/0192640 A1 | 8/2012 | Minh et al. | |
| 2013/0202090 A1* | 8/2013 | Belcher | G01N 23/203 378/87 |
| 2013/0215715 A1* | 8/2013 | Hollstein | G01V 11/00 367/35 |
| 2013/0271066 A1 | 10/2013 | Signorelli et al. | |

FOREIGN PATENT DOCUMENTS

| | | |
|---|---|---|
| WO | WO-20080061225 A1 | 3/2008 |
| WO | WO-2013101981 A1 | 7/2013 |

OTHER PUBLICATIONS

"International Application Serial No. PCT/US2015/022729, Written Opinion dated Dec. 18, 2015", 10 pgs.

"International Application Serial No. PCT/US2015/022748, International Search Report dated Dec. 24, 2015", 3 pgs.

"International Application Serial No. PCT/U52015/022748, Written Opinion dated Dec. 24, 2015", 6 pgs.

"International Application Serial No. PCT/US2015/063693, International Search Report dated Feb. 3, 2016", 3 pgs.

"International Application Serial No. PCT/US2015/063693, Written Opinion dated Feb. 3, 2016", 4 pgs.

"International Application Serial No. PCT/US2015/063711, Written Opinion dated Mar. 15, 2016", 9 pgs.

Moake, G. L., et al., "Standoff and Caliper Measurements While Drilling Using a New Formation-Evaluation Tool With Three Ultrasonic Transducers", SPE Drilling & Completion, (Jun. 1995), 104-111.

"International Application Serial No. PCT/US2015/063711, International Search Report dated Mar. 15, 2016", 3 pgs.

Moake, G. L., et al,, "Standoff and Caliper Measurements While Drilling Using a New Formation-Evaluation Tool With Three Ultrasonic Transducers", SPE Drilling & Completion, (Jun. 1995), 104-111.

\* cited by examiner

STANDOFF DETERMINATION

CLAIM OF PRIORITY

This application is a U.S. National Stage Filing under 35 U.S.C, 371 from International Application No. PCT/US2015/063693, filed on 3 Dec. 2015, which is a continuation-in-part of PCT Application Ser. No, PCT/US2015/022729 and PCT Application Ser. No. PCT/US2015/022748, both filed on 26 Mar. 2015, and hereinafter referred to as "the Priority Applications," which Priority Applications designated all PCT contracting states, and which Priority Applications and International Application No. PCT/US2015/063693 are incorporated herein by reference in their entirety. This application is related to PCT Application Ser. No. PCT/US2015/063711, titled "DRILLING FLUID PROPERTY DETERMINATION," filed on 3 Dec. 2015.

BACKGROUND

Understanding the structure and properties of geological formations may reduce the cost of drilling wells for oil and gas exploration. Measurements are typically performed in a borehole (i.e., downhole measurements) in order to attain this understanding. For example, the measurements may identify the composition and distribution of material that surrounds the measurement device downhole. The accuracy of the identification may depend on how precisely the tool can be located in the borehole.

In sonic cases, the tool is located in a two-part process. In the first part, an ultrasonic transducer, known to those of ordinary skill in the art as a mud transducer, is used to generate acoustic pulses that traverse separate paths, to determine ultrasonic velocity in the drilling fluid (or "mud"), using the time difference between the pulses upon traversing their respective path lengths.

In a second part, the drilling fluid velocity defined by the mud transducer measurement can be used to determine the tool standoff in the borehole, using the time delay between pulse transmission and reception for a pitch-catch transducer. However, mud transducer measurements are impacted by temperature, density, viscosity, and suspended particulates. These elements lead to systematic measurement errors. Moreover, the measured time difference for the pitch-catch transducer is also limited in its accuracy. Thus, two types of measurement errors manifest themselves during tool location operations.

DETAILED DESCRIPTION

Apparatus, systems, and methods are described herein that provide a new mechanism to determine ultrasonic pitch-catch transducer position downhole in real time by employing nuclear technology, so that tool eccentricity correction can be applied in a useful manner. As an alternative to the two-part process described previously, a single measurement can be made using X-ray array sensors traversing a specified path length. This is a high resolution technique with accuracy on the order of 1 mm. Based on the relatively high standoff resolution, the standoff of an ultrasonic transducer relative to the borehole wall and/or casing can be more precisely determined during logging operations. In some embodiments, the mud velocity can be correspondingly inverted using the standoff and time delay as inputs to the inversion process. The details of various embodiments will now be described.

Figure 1:
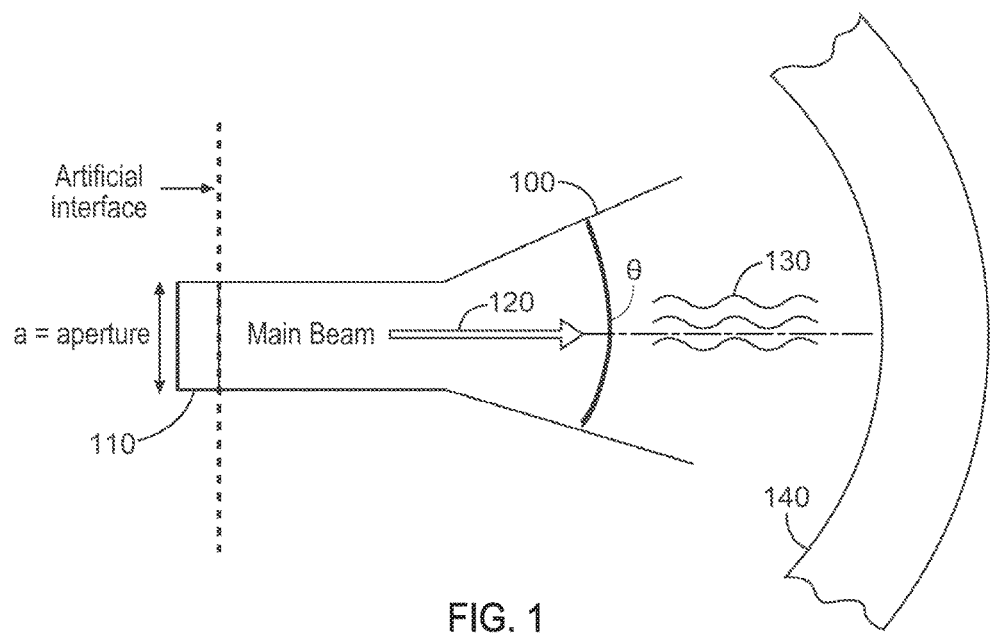
FIG. 1 illustrates the transmission beam pattern of an ultrasonic transducer, according to various embodiments.

FIG. 1 illustrates the transmission beam pattern 100 of an ultrasonic transducer 110, according to various embodiments. Here the ultrasonic transducer 110 is shown firing an ultrasonic beam 120 into drilling fluid 130, toward a borehole wall 140. The beam pattern 100 determines direct reflection and pulse-echo time, which is sensitive to tool position (i.e., eccentricity) in the borehole.

Measurements are usually made in the far field, since near field wave propagation is relatively noisy. The width of the beam is determined by the aperture a or focal width of the ultrasonic transducer 110, the length of the transducer, and the excitation frequency. The received waveform amplitude depends on the resulting beam pattern 100.

Figure 2:
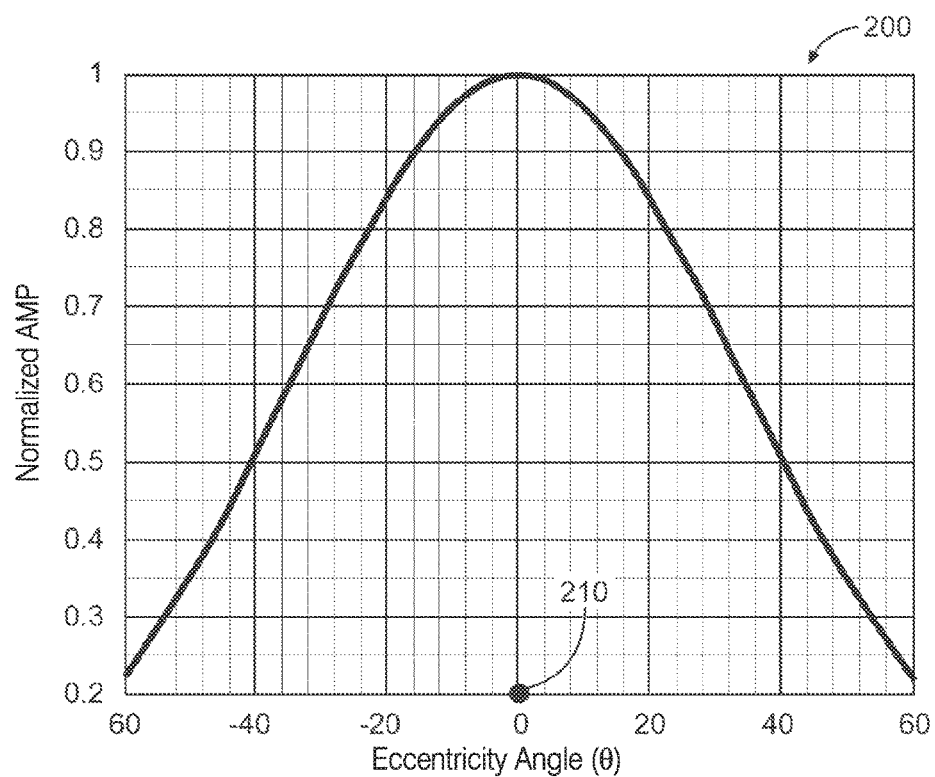
FIG. 2 is a graph illustrating the far-field signal amplitude resulting from the beam pattern of FIG. 1.

For example, FIG. 2 is a graph 200 illustrating the far-field signal amplitude resulting from the beam pattern 100 of FIG. 1. This amplitude can be expressed as shown in Equation (1):

$$P(r, \theta) = \frac{P_o \omega}{j(\lambda)^{1/2}} e^{2j\pi r/\lambda} \frac{\sin(\pi \omega/\lambda \sin\theta)}{\pi \omega/\lambda \sin\theta} \cos\theta \qquad (1)$$

Here, r is the distance from the source to the reflection point, which is equivalent to the standoff distance; $\theta$ is the azimuthal angle as it varies from the center of the beam, which is equivalent to the eccentricity angle; $P_O$ is the source signal amplitude in dB (e.g., generated by transducer 210); $\omega$ is the inverse of the source operating frequency; and $\lambda$ is the source operating wavelength.

When ultrasonic waves propagate through the mud with different traveling path lengths, the return signal amplitudes vary, due to beam spreading. Therefore, standoff measurement and correction is often implemented in the field, in the pursuit of better tool centralization. However, due to the non-ideal nature of the tool rotation process, it is difficult to centralize the tool position in the borehole. The resulting eccentricity also affects beam spreading.

Figure 3:
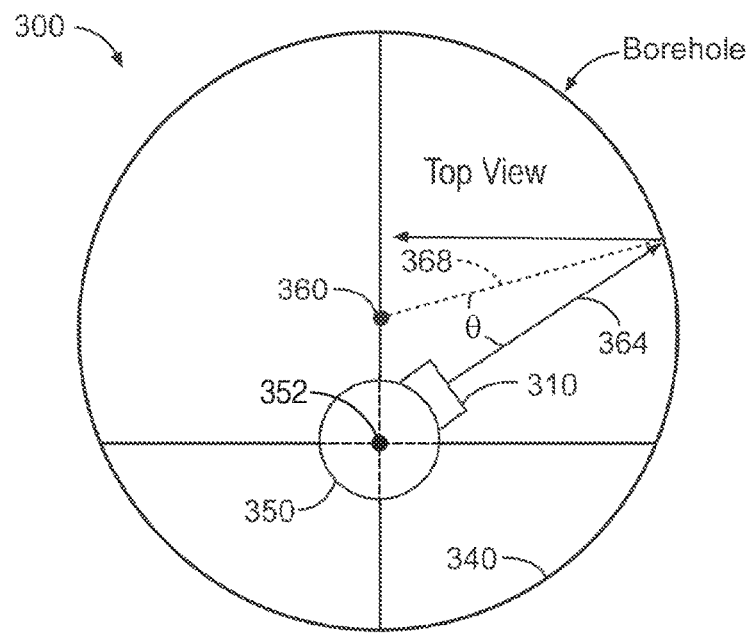
FIG. 3 is a top view of a transducer, eccentrically-positioned in a wellbore, according to various embodiments.

FIG. 3 is a top view 300 of a transducer 310, eccentrically-positioned in a wellbore 340, according to various embodiments. In real time processing, correction for eccentric positioning of the tool is useful to precisely determine the tool location for ultrasonic logging, to improve beam pattern performance and as a result, measurement accuracy. In this case, the tool 350 is eccentrically-positioned with respect to the center 360 of the wellbore. The eccentricity angle θ comprises the angle between the transducer main beam 364 and the borehole radius 368. The distance from the center 352 of the tool 350 to the center 360 of the wellbore 340 is the "offset".

Figure 4:
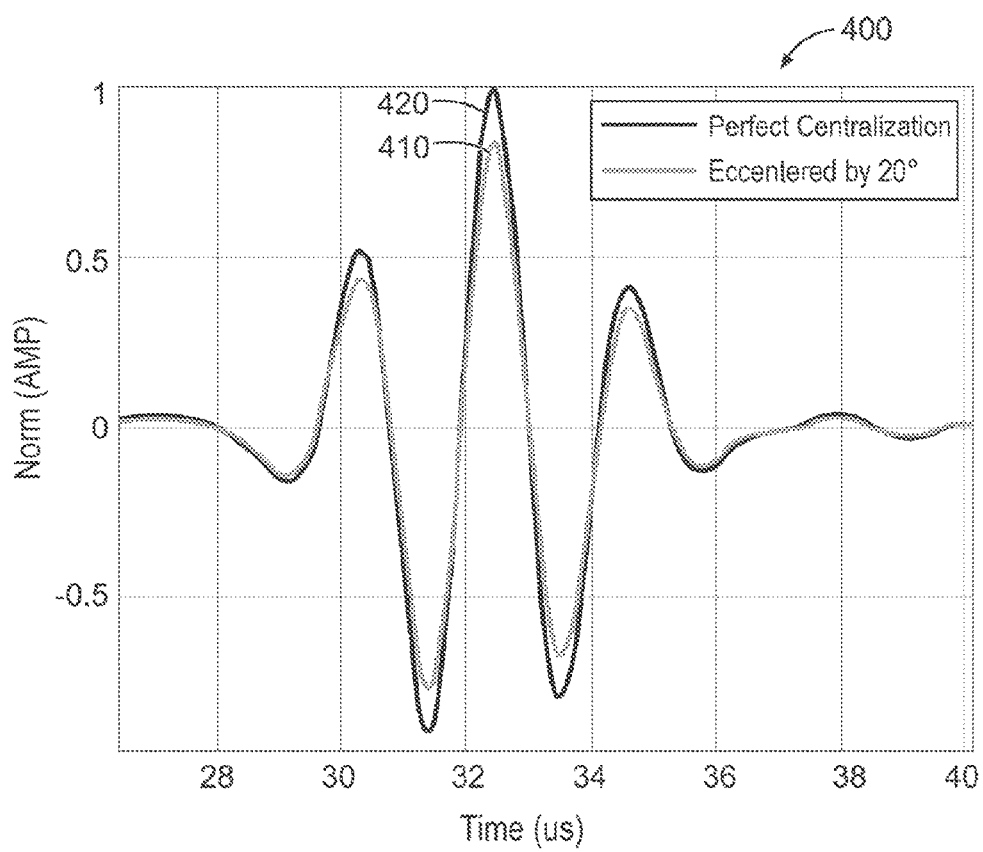
FIG. 4 is a graph comparing normalized reception signal amplitudes for an ultrasonic transducer element that is substantially centered in a wellbore, and one that is eccentrically-positioned, according to various embodiments.

FIG. 4 is a graph 400 comparing normalized reception signal amplitudes for an ultrasonic transducer element that is substantially centered in a wellbore, and one that is eccentrically-positioned, according to various embodiments. As noted previously, the traditional approach to determining tool location for eccentricity correction uses a mud transducer to measure the drilling fluid velocity, and a pitch-catch transducer to provide a running account of distance to the borehole wall, based on the velocity, and signal transit time. Thus, the mud transducer can be used to obtain the time delay of the ultrasonic signals traveling in the mud, from the ultrasonic source to the receiver, according to Eq. 1. Since the mud velocity and the time delay are then known, it should straightforward to determine the standoff for the pitch-catch transducer attached to the tool. However, since two different measurements are independently employed (i.e., the mud transducer and the pitch-catch standoff transducer), the inversion standoff is contaminated by the errors resulting from each measurement. More particularly, in the pitch-catch measurement, the amplitude of the signal that is actually received (represented by the 20 degree eccentric signal 410) can be considerably less than the signal that is desired (represented by the "Perfect Centralization" signal 420). This is because the acoustic propagation velocity is a function of the mud weight, bonding between heterogeneous layers, and other factors. Both phase and amplitude can be affected by these environmental parameters. Thus, to solve at least part of this technical problem, an array nuclear technique described herein has been established.

Figure 5:
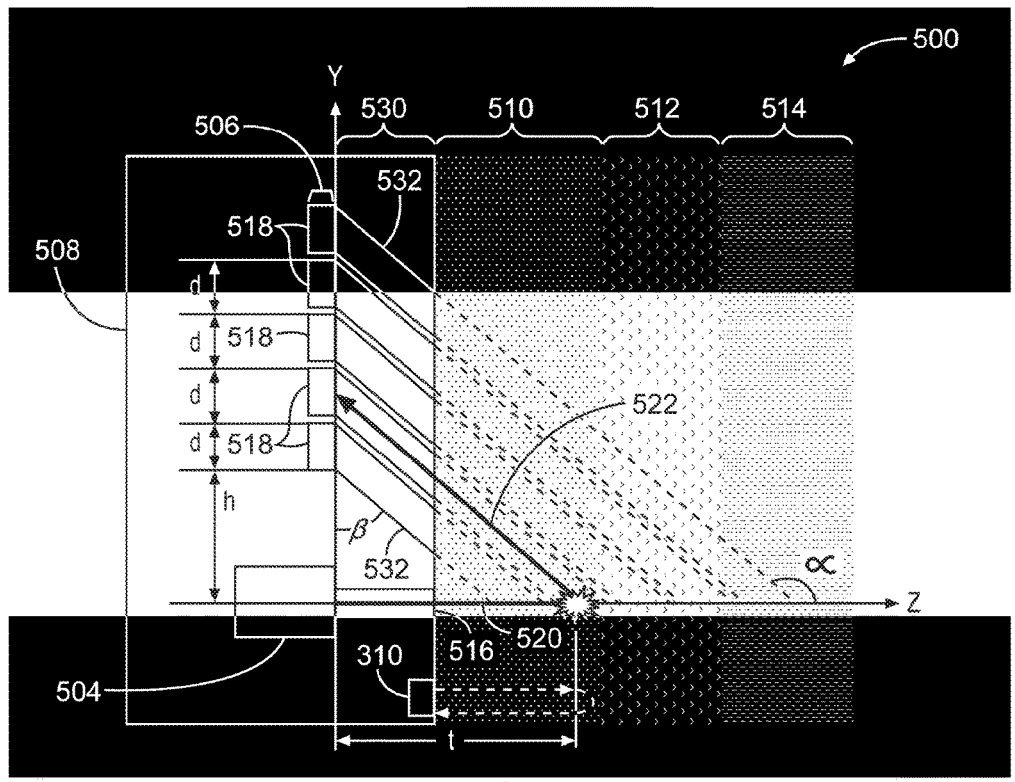
FIG. 5 illustrates a side, cut-away view of an energy generation and photon collimation apparatus, to measure photon activity, according to various embodiments.

FIG. 5 illustrates a side, cut-away view of an energy generation and photon collimation apparatus 500, to measure photon activity, according to various embodiments. Here a photon source 504 is used to project photons 520 into one or more materials 510, 512, 514. The source 504 thus emits photons at one or more energies or over broad range of energy and may comprise a chemical source Cs-137, induced gamma-rays from neutron activation, or an electronic source such as an X-ray tube, producing energy from 0-400 keV.

For example, a first material 510 might comprise mud, a second material 512 might comprise steel casing, and a third material 514 might comprise cement. The photons 522 that are redirected from the interaction between the original projection of photons 520 and the materials 510, 512, 514 are reflected to pixels 518 in a detector array 506, where the count rates at each pixel 518 are substantially linearly proportional to the density of photons 522 at the measurement point.

The pixelated array 506 array of photon detection devices may operate to produce scintillation light in response to receiving the redirected photons 522. Thus, the array 506 may comprise a gamma-ray scintillator in some embodiments.

The pixels 518 in the array 516 may also comprise photo-sensors, to produce an electrical signal in response to scintillation lights or photons. Thus, the array 506 may comprise a photomultiplier tube (PMT) or photodiodes. The pixels in the array 506 may also comprise semiconductor material.

The use of multiple pixelated sensors in the array 506, along with an angled collimator 530, permit the detection mechanism to operate over a range of radial depths, and defines the volume of investigation. The geometry of the collimator 530 is designed to accept the photons 522 with single Compton backscattering at a fixed angle α while substantially rejecting photons that arrive via multiple Compton scattering events. The collimator 530 may include an array of tubes 532 arranged at angle β with respect to the plane of the array 506. The slanted-tube collimator design thus provides a one-dimensional (1-D) radial spectrum of the backscattered photons and rotation of the housing 508 can provide circumferential scans to create a two-dimensional (2-D) tomographic image of the borehole if desired.

A housing 508 may be attached to, or wholly contain the source 504, the array 506, and/or the collimator 530. The housing 508 may take the form of an array nuclear tool in some embodiments.

Figure 6:
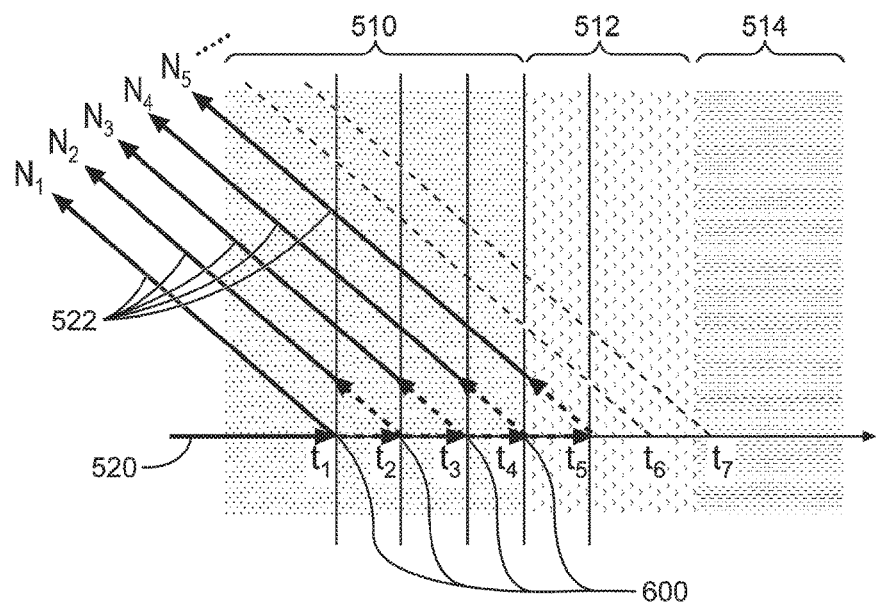
FIG. 6 illustrates Compton backscattering events associated with the apparatus of FIG. 5.

FIG. 6 illustrates Compton backscattering events 600 associated with the apparatus of FIG. 5. These events 600 are the result of interaction between the emitted photons 520 and multiple layers of materials 510, 51.2, 514.

Here $N_i$ represents the number of detected photons in the $i^{th}$ detector element after Compton backscatterinig occurs at some distance from the reference point (i.e., the distance between the face 516 of the source 504 and the detectors 518, as defined in FIG. 5).

Referring now to FIGS. 5 and 6, it can be seen that in some embodiments, the detector elements have the same height, d, and hence each distance increases according to the same increment, $$\frac{d}{\tan(\pi - \alpha)}.$$

The differences between $N_i$ and $N_{i+1}$ can be explained by photon interactions along the extended travel path presented by dashed arrows. For example, $N_2$ is approximately proportional to the function shown below:

$$N_2 \propto I_1 \times \left\{ \begin{array}{l} \rho_{m1} \times \exp\left(-\mu_{m1}(E) \times \frac{d}{\tan(\pi - \alpha)}\right) \times \\ \exp\left(-\mu_{m1}(E') \times \frac{d}{\sin(\pi - \alpha)}\right) \end{array} \right\} \times$$

$$\exp\left(-\mu_{m1}(E') \times \frac{t_1}{\cos(\pi - \alpha)}\right)$$

assuming the intensity of incoming photon of energy E is $I_1$ at $t_1$, and that $\rho_{m1}$ and $\mu_{m1}$ represent the density and linear attenuation coefficient of the first material 510, respectively. E' is readily calculated from the Compton equation when the initial photon energy and the scattering angle are known.

All Compton backscattering events are occurring in the same material in this case and $N_3$ can be given as approximately equal to the following function:

$$N_3 \propto I_2 \times \left\{ \begin{array}{c} \rho_{m1} \times \exp\left(-\mu_{m1}(E) \times \dfrac{d}{\tan(\pi - \alpha)}\right) \times \\ \exp\left(-\mu_{m1}(E') \times \dfrac{d}{\sin(\pi - \alpha)}\right) \end{array} \right\} \times$$

$$\exp\left(-\mu_{m1}(E') \times \frac{t_2}{\cos(\pi - \alpha)}\right) = I_1 \times \exp\left(-\mu_{m1}(E) \times \frac{d}{\tan(\pi - \alpha)}\right) \times$$

$$\left\{ \begin{array}{c} \rho_{m1} \times \exp\left(-\mu_{m1}(E) \times \dfrac{d}{\tan(\pi - \alpha)}\right) \times \\ \exp\left(-\mu_{m1}(E') \times \dfrac{d}{\sin(\pi - \alpha)}\right) \end{array} \right\} \times$$

$$\exp\left(-\mu_{m1}(E') \times \frac{t_1}{\cos(\pi - \alpha)}\right) \times \exp\left(-\mu_{m1}(E') \times \frac{d}{\sin(\pi - \alpha)}\right)$$

Taking the ratio of $N_2$ to $N_3$, as expressed above, results in $$\frac{N_2}{N_3} = \exp\left(-\mu_{m1}(E) \times \frac{d}{\tan(\pi - \alpha)}\right) \times \exp\left(-\mu_{m1}(E') \times \frac{d}{\sin(\pi - \alpha)}\right)$$

The ratio of $N_2$ to $N_3$ becomes a constant as long as each results from Compton backscattering events within the same material, and can be generalized to the expression shown in Equation (2):

$$\frac{N_i}{N_{i+1}} = \exp\left(-\mu_{m1}(E) \times \frac{d}{\tan(\pi - \alpha)}\right) \times \exp\left(-\mu_{m1}(E') \times \frac{d}{\sin(\pi - \alpha)}\right) = \quad (2)$$

$$\text{constant} = C_1$$

where $C_1$ is determined by the property of the first material 510. If there is a transition from one material (e.g. the first material 510) to another (e.g., the second material 512), which involves the path distances $N_4$ and $N_5$, the equation can be rearranged as shown in Equation (3):

$$\frac{N_i}{N_{i+1}} = \quad (3)$$

$$\frac{\rho_{m1}}{\rho_{m2}} = \exp\left(-\mu_{m2}(E) \times \frac{d}{\tan(\pi - \alpha)}\right) \times \exp\left(-\mu_{m2}(E') \times \frac{d}{\sin(\pi - \alpha)}\right) =$$

$$\frac{\rho_{m1}}{\rho_{m2}} \times \text{constant} = \frac{\rho_{m1}}{\rho_{m2}} \times C_2 = D_1$$

where the value of $C_2$ is determined by the property of the second material 512.

In the case of x-ray tube source, the mean energy of the photon spectrum can be used and Equations (2) and (3) can be replaced by Equations (4) arid (5), respectively.

$$\frac{N_i}{N_{i+1}} = \exp\left(-\mu_{m1}(\overline{E}) \times \frac{d}{\tan(\pi - \alpha)}\right) \times \exp\left(-\mu_{m1}(\overline{E'}) \times \frac{d}{\sin(\pi - \alpha)}\right) = C_1 \quad (4)$$

$$\frac{N_i}{N_{i+1}} = \quad (5)$$

$$\frac{\rho_{m1}}{\rho_{m2}} = \exp\left(-\mu_{m2}(\overline{E}) \times \frac{d}{\tan(\pi - \alpha)}\right) \times \exp\left(-\mu_{m2}(\overline{E'}) \times \frac{d}{\sin(\pi - \alpha)}\right) =$$

$$\frac{\rho_{m1}}{\rho_{m2}} \times C_2 = D_1$$

Therefore it is expected that a distribution of ratio values for the geometry shown in FIG. 5 may be constructed as shown in FIG. 6 under some conditions. For a given detector geometry, the distance to a boundary is simply given by $$\frac{H}{\tan(\pi - \alpha)},$$

where H is the height of the detector element whose ratio value corresponds to either a valley (minimal value) or a peak (maximal value). The uncertainty of the determined distance is $$\pm \frac{d/2}{\tan(\pi - \alpha)}$$

and accuracy on the order of a millimeter can be achieved when a semiconductor photon detector, with a pixel size on the order of a millimeter or less, is used along with collimators of comparable dimensions. Finally, the density of the materials, such as the first material 510 (e.g., borehole fluid, or "mud") can be deduced from the ratio $$\frac{D_1}{C_2}$$

in a cased hole since the density of the second material 512 (e.g. steel casing, having a density of $\rho_{m2}$) is known.

Moreover, the ratio between the value of $N_i$ for adjacent detectors can be calculated, so dramatic changes in the ratio may be used to indicate when the emitted photons 520 cross a layer (material) boundary. Therefore changes in the ratio for adjacent detectors can be used to detect the thickness of each material (e.g., mud or casing).

Figure 7:
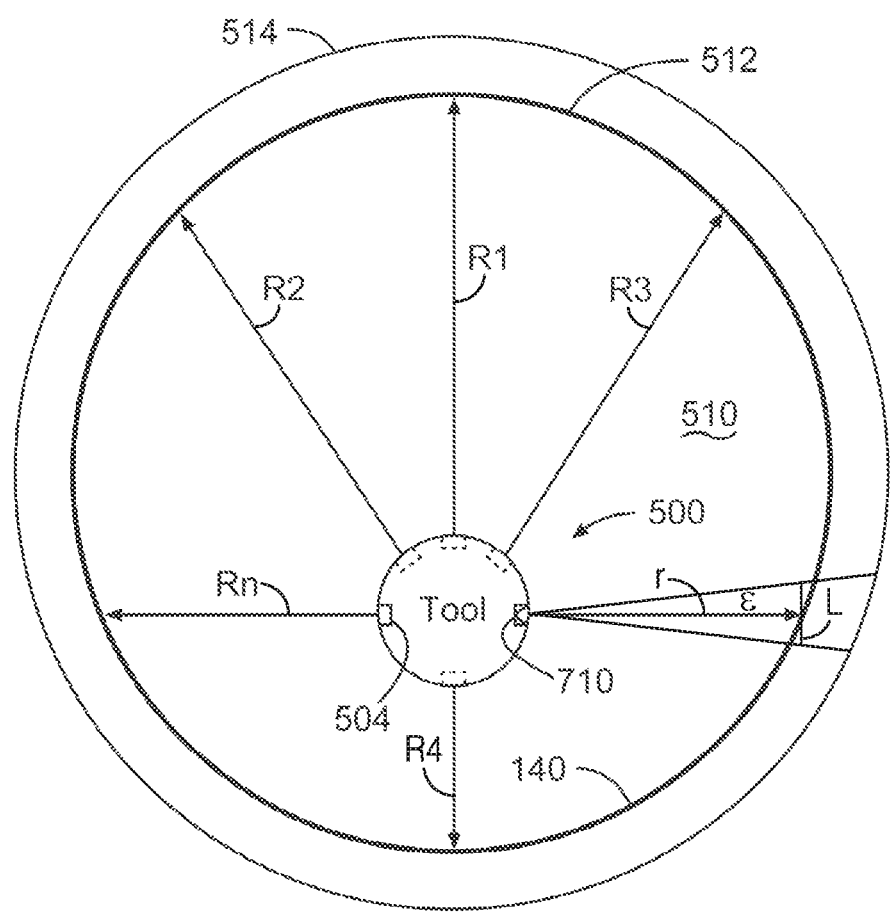
FIG. 7 illustrates a top view of an apparatus to determine ultrasonic transducer location using a nuclear logging tool, according to various embodiments.

FIG. 7 illustrates a top view of an apparatus 500 to determine ultrasonic transducer location using a nuclear logging tool, according to various embodiments. For each rotational scan, depending on logging speed and tool specifications, an ultrasonic logging tool normally obtains hundreds of shots, or distance measurements. Based on standoff distances provided by the nuclear tool for each shot, the tool position can be directly plotted, as shown in the figure. Here, R1, R2, R3, . . . , Rn represent measured nuclear azimuthal standoff values.

Standoff determination using the source 504 is a one-time measurement, different from that obtained using traditional measurements with an ultrasonic mud cell transducer. Once the standoff is determined using, for example, a nuclear array tool, the angle ε for beam spreading can be calculated using Equation (6), where 2*ε is the beam spread angle, r is the standoff distance and L is the width of the beam at the standoff distance r:

$$\tan \varepsilon = \frac{L/2}{r}. \quad (6)$$

Moreover, the mud velocity for the fluid in the wellbore (i.e., first material 510) can be calculated using Equation (7). This value, which is the standoff provided by the array nuclear tool and ΔTime (i.e., the time delay between transmission and reception), can be used as a quality control indicator against the standoff distance r which is estimated by the mud cell transducer 710 of ultrasonic logging tool. Still further embodiments may be realized.

$$V_{mud} = \frac{\text{Standoff}}{\Delta \text{Time}} \quad (7)$$

Figure 8:
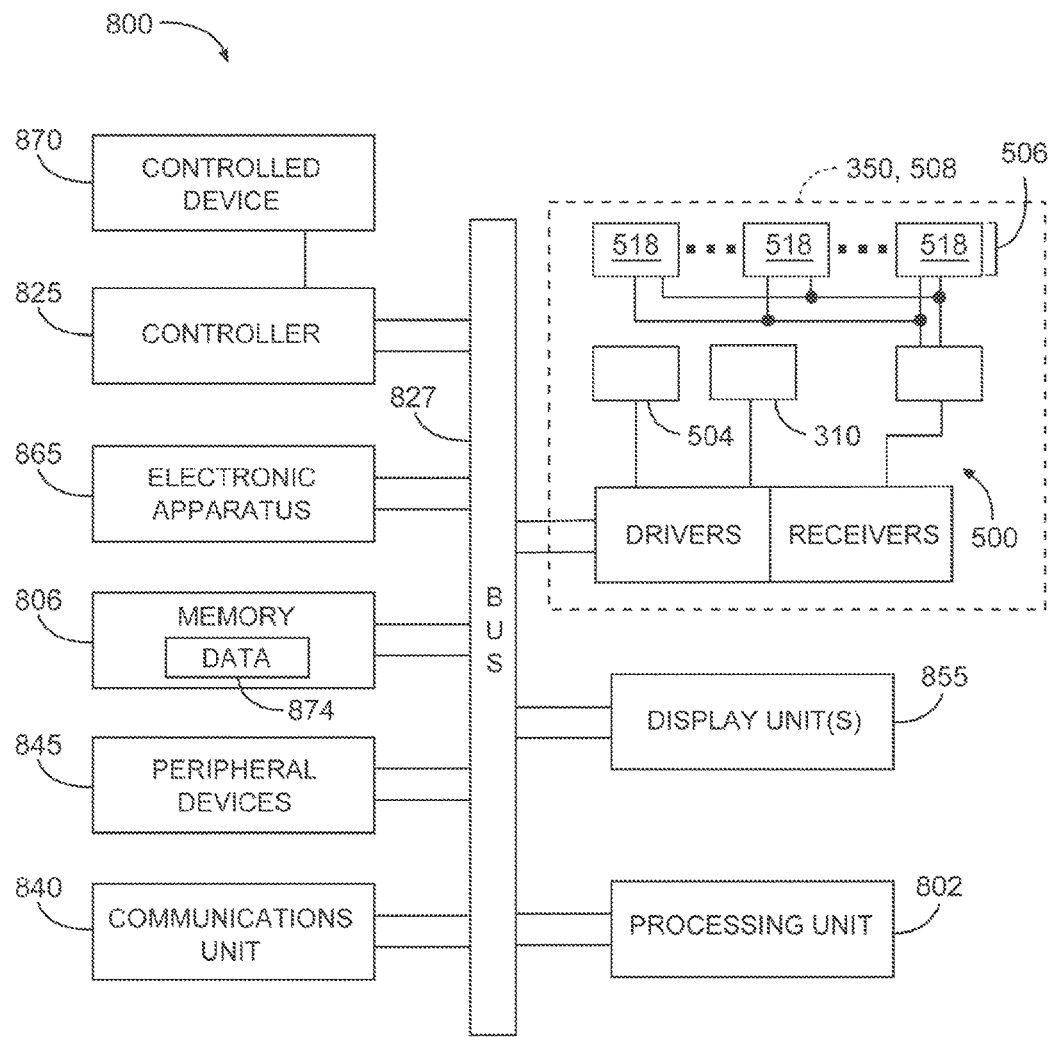
FIG. 8 is a block diagram of apparatus and systems according to various embodiments.

FIG. 8 is a block diagram of apparatus 500 and systems 800 according to various embodiments. Here, it can be seen that the system 800 may include a controller 825 specifically configured to interface with a controlled device 870, such as an ultrasonic tool, a nuclear tool, a geosteering unit, and/or a user display or touch screen interface in addition to displays 855). The system 800 may further include sensors, such as electromagnetic transmitters and receivers, transducers, an array 506 of pixels 518, etc. attached to a tool 508, forming part of an apparatus 500. When configured in this manner, the system 800 can receive measurements and other data (e.g., location and conductivity or resistivity information, among other data) to be processed according to various methods described herein.

A processing unit 802 can be coupled to the apparatus 500 to obtain measurements from the array 506, and other components that may be attached to a housing 508. Thus, in some embodiments, a system 800 comprises a housing 508 that can be attached to or used to house the apparatus 500, and perhaps the controlled device 870, among other elements. The housing 508 might take the form of a wireline tool body, or a downhole tool as described in more detail below with reference to FIGS. 10 and 11. The processing unit 802 may be part of a surface workstation, or attached to the housing 508.

The system 800 can include other electronic apparatus 865, and a communications unit 840. Electronic apparatus 865 (e.g., electromagnetic sensors, current sensors, and other devices) can also be used in conjunction with the controller 825 to perform tasks associated with taking measurements downhole. The communications unit 840 can be used to handle downhole communications in a drilling operation. Such downhole communications can include telemetry.

The system 800 can also include a bus 827 to provide common electrical signal paths between the components of the system 800. The bus 827 can include an address bus, a data bus, and a control bus, each independently configured. The bus 827 can also use common conductive lines for providing one or more of address, data, or control, the use of which can be regulated by the controller 825 and/or the processing unit 802.

The bus 827 can include instrumentation for a communication network. The bus 827 can be configured such that the components of the system 800 are distributed. Such distribution can be arranged between downhole components such as the components attached to the housing 508, and components that are located on the surface of a well. Alternatively, several of these components can be co-located, such as on one or more collars of a drill string or on a wireline structure.

In various embodiments, the system 800 includes peripheral devices that can include displays 855, additional storage memory, or other control devices that may operate in conjunction with the controller 825 or the processing unit 802. The displays 855 can display diagnostic and measurement information for the system 800, based on the signals generated according to embodiments described above.

In an embodiment, the controller 825 can be fabricated to include one or more processors. The display 855 can be fabricated or programmed to operate with instructions stored in the processing unit 802. (for example in the memory 806) to implement a user interface to manage the operation of the system 800, including any one or more components distributed within the system 800. This type of user interface can be operated in conjunction with the communications unit 840 and the bus 827. Various components of the system 800 can be integrated with a bottom hole assembly, if desired, which may in turn be used to house the apparatus 500, such that operation of the apparatus 500, and processing of the measurement data, identical to or similar to the methods discussed previously, and those that follow, can be conducted according to various embodiments that are described herein.

In some embodiments, a non-transitory machine-readable storage device can comprise instructions stored thereon, which, when performed by a machine, cause the machine to become a customized, particular machine that performs operations comprising one or more features similar to or identical to those described with respect to the methods and techniques described herein. A machine-readable storage device, as described herein, is a physical device that stores information (e.g., instructions, data), which when stored, alters the physical structure of the device. Examples of machine-readable storage devices can include, but are not limited to, memory 806 in the form of read only memory (ROM), random access memory (RAM), a magnetic disk storage device, an optical storage device, a flash memory, and other electronic, magnetic, or optical memory devices, including combinations thereof.

The physical structure of stored instructions may be operated on by one or more processors such as, for example, the processing unit 802. Operating on these physical structures can cause the machine to become a specialized machine that performs operations according to methods described herein. The instructions can include instructions to cause the processing unit 802 to store associated data or other data in the memory 806. The memory 806 can store the results of measurements of formation parameters, to include gain parameters, calibration constants, identification data, sensor location information, sensor extension/retraction force information, etc. The memory 806 can store a log of the measurement and location information provided by the system 800. The memory 806 therefore may include a database, for example a relational database. The processors 830 can be used to process the data 874 to form images of the casing or cement surrounding a well, as well as the formation itself.

Thus, referring to FIGS. 1-8, it can be seen that many embodiments may be realized. For example, an apparatus 500 may comprise an array 506 of X-ray detectors (e.g., in the form of pixels 518) that are used to determine borehole standoff, that is used in turn by a processing unit 802 to correct distance measured via ultrasound.

In some embodiments, an apparatus 500 comprises an array 506 of X-ray detectors mechanically coupled to a collimator 530 to determine standoff to a borehole based on photon activity measured by the array 506. The apparatus 500 may further comprise an ultrasonic transducer 310 to measure a measured distance in mud (e.g., first material 510) in the borehole, as well as a processing unit 802 to correct the measured distance to provide a corrected distance in the mud according to the standoff.

The X-ray detectors may comprise a complementary metal-oxide. semiconductor material. Thus, in some embodiments, the array 506 of X-ray detectors comprises a complementary metal-oxide semiconductor material arranged in a pixelated format.

The array may be arranged in a linear fashion. Thus, in some embodiments, the array 506 of X-ray detectors comprises a substantially linear arrangement of detector elements (e.g., pixels 518).

The collimator may include an array of tubes oriented at the same angle to the array of detectors. Thus, in some embodiments, the collimator 530 comprises an array of tubes 532 to direct photons engaged in the photon activity in the mud to the array 506 of X-ray detectors. In many embodiments, each of the tubes 532 are disposed at a substantially similar angle β to the array 506 of X-ray detectors.

An angled collimator may provide different ((known) travel path lengths for photons, through downhole mud. Thus, in some embodiments, the tubes 532 in the collimator 530 are arranged in a substantially similar orientation to provide a plurality of different travel path lengths, as measured along an energy path created by single source of energy, for photons 522 associated with the photon activity and received by the array, The apparatus may include a source of energy, to generate photons in the mud. Thus, in some embodiments, the apparatus 500 comprises a source 504 of energy to direct the energy into the mud, to generate the photon activity. In some embodiments, the source 504 of energy comprises an X-ray tube.

A system 800 may comprise a combination of the apparatus 500 and a tubular member (e.g., taking the form of a tool 350 and/or housing 508). Thus, in some embodiments, a system 800 comprises a tubular member and an array 506 of X-ray detectors attached to the tubular member and mechanically coupled to a collimator 530 to determine standoff to a borehole based on photon activity measured by the array 506. The system 800 may further comprise an ultrasonic transducer 310 to measure a measured distance in mud in the borehole and a processing unit 802 to correct the measured distance to provide a corrected distance according to the standoff.

The system may comprise an ultrasonic tool, enhanced by an array of X-ray detectors. Thus, in some embodiments, the tubular member (e.g., housing 508) comprises an ultrasonic logging tool.

The system may comprise a wireline system or a drilling system. Thus, in some embodiments, the tubular member (e.g., housing 508) comprises one of a wireline tool or a drilling tool.

The system may include a processing unit to assist with acoustic impedance determination. Thus, in some embodiments, the processing unit 802 in the system 800 can operate to determine the corrected distance based on energy loss due to beam spreading.

The apparatus 500, system 800, and each of their elements may all be characterized as "modules" herein. Such modules may include hardware circuitry, and/or a processor and/or memory circuits, software program modules and objects, and/or firmware, and combinations thereof, as desired by the architect of the apparatus 500 and systems 800, and as appropriate for particular implementations of various embodiments. For example, in some embodiments, such modules may be included in an apparatus 500 and/or system 800 operation simulation package, such as a software electrical signal simulation package, a power usage and distribution simulation package, a power/heat dissipation simulation package, a formation imaging package, an energy detection and measurement package, and/or a combination of software and hardware used to simulate the operation of various potential embodiments.

It should also be understood that the apparatus 500 and systems 800 of various embodiments can be used in applications other than for logging operations, and thus, various embodiments are not to be so limited. The illustrations of apparatus 500 and systems 800 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Such apparatus and systems may further be included as sub-components within a variety of electronic systems, such as televisions, cellular telephones, personal computers, workstations, radios, vehicles, geothermal tools, and smart transducer interface node telemetry systems, among others. Some embodiments include a number of methods.

Figure 9:
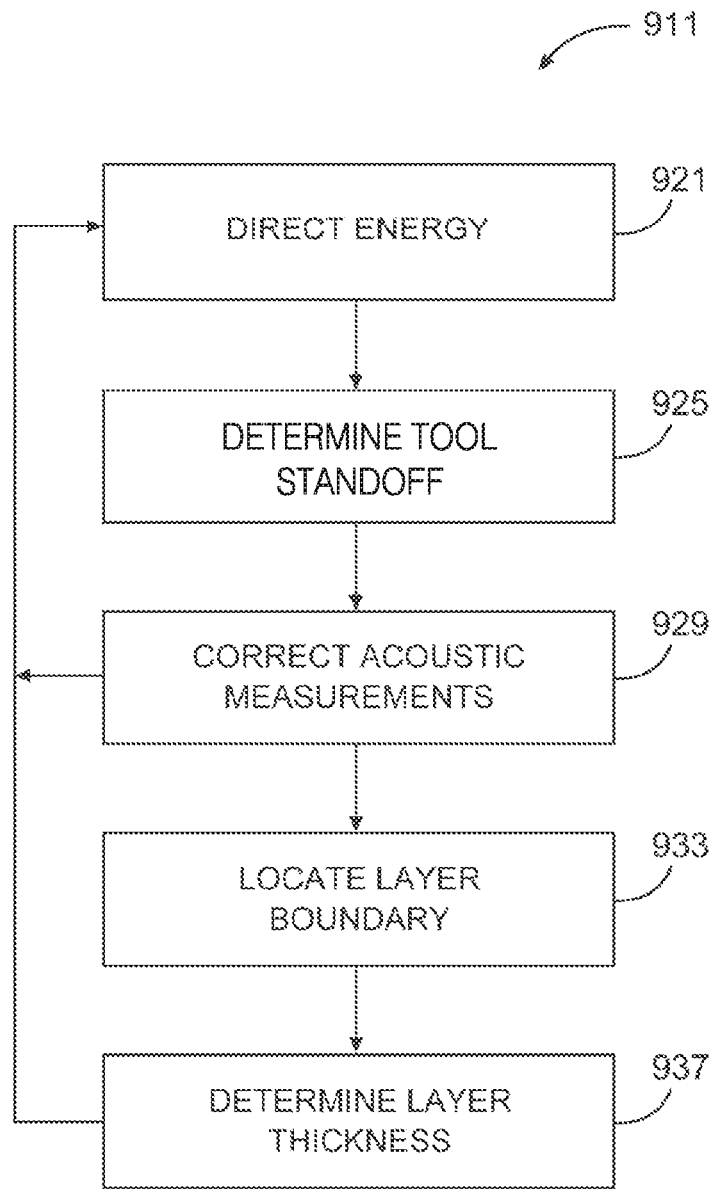
FIG. 9 is a flow chart illustrating several methods according to various embodiments.

FIG. 9 is a flow chart illustrating several methods 911 according to various embodiments. The methods 911 may comprise processor-implemented methods, to execute on one or more processors that perform the methods. For example, one embodiment of the methods 911 may begin at block 921 with determining tool standoff using a nuclear tool at block 925, and then correcting acoustic measurements based on the standoff at block 929.

X-ray energy can be directed into fluid in the borehole, such as drilling mud, to generate photons. Thus, in some embodiments, a method 911 begins at block 921 with directing energy comprising X-rays, using a source of the energy attached to a nuclear tool, into mud downhole.

The method 911 may continue on to block 925 with determining downhole tool standoff using a nuclear tool and photon activity. An array of photon detectors can be used to measure the level of photon activity. Thus, in some embodiments, using the nuclear tool at block 925 may comprise measuring the photon activity using an array of photon detectors.

Ratios of photon activity can be determined, as measured between detectors in an array, to indicate media transitions. Thus, in some embodiments, measuring the photon activity at block 925 further comprises calculating a ratio of the photon activity for adjacent ones of the photon detectors.

In some embodiments, the tool standoff is determined by measuring the photon activity. Thus, the activity at block 925 may further comprise. determining the downhole tool standoff by counting Compton backscattering events associated with the photon activity created by interaction of the energy and the mud, wherein the events are monitored along an angle to the nuclear tool.

A plurality of photon travel path lengths can be used to determine the tool standoff. Thus, the activity of determining the downhole tool standoff at block 925 may comprise averaging a plurality of standoff distances corresponding to a plurality of photon travel path lengths determined by a collimator mechanically coupled to an array of detectors in the nuclear tool.

In many embodiments, the method 911 continues on to block 929 to include correcting acoustic measurements using the standoff.

Array measurements can thus be used to determine standoff, and an additional correction based on beam spreading can also be made. Thus, in some embodiments, correcting the acoustic measurements further comprises adjusting the acoustic measurements for beam spreading.

Each ultrasonic measurement can be individually adjusted. Thus, in some embodiments, correcting the acoustic measurements at block 929 further comprises adjusting a particular one of the acoustic measurements using the downhole tool standoff corresponding to the particular one of the acoustic measurements to provide an adjusted measurement; and then repeating the adjusting for additional ones of the acoustic measurements.

A selected amount of change in the ratio of counts made by adjacent detectors can be used to indicate the presence of a layer boundary. Thus, some embodiments of the method 911 continue to block 933 to include determining a location of a layer boundary based on a change in the ratio.

Defined boundaries for a layer can be used to determine the thickness of a layer. Thus, some embodiments of the method 911 continue to block 937 to include determining the thickness of the layer based on the location of the layer boundary.

In some embodiments, the method 911 may continue from block 937 to return to block 921, to repeat the activities designated therein, as well as in the other blocks of the method 911.

It should be noted that the methods described herein do not have to be executed in the order described, or in any particular order. Moreover, various activities described with respect to the methods identified herein can be executed in iterative, serial, or parallel fashion. The various elements of each method (e.g., the methods shown in FIG. 9) can be substituted, one for another, within and between methods. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein.

For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

Figure 10:
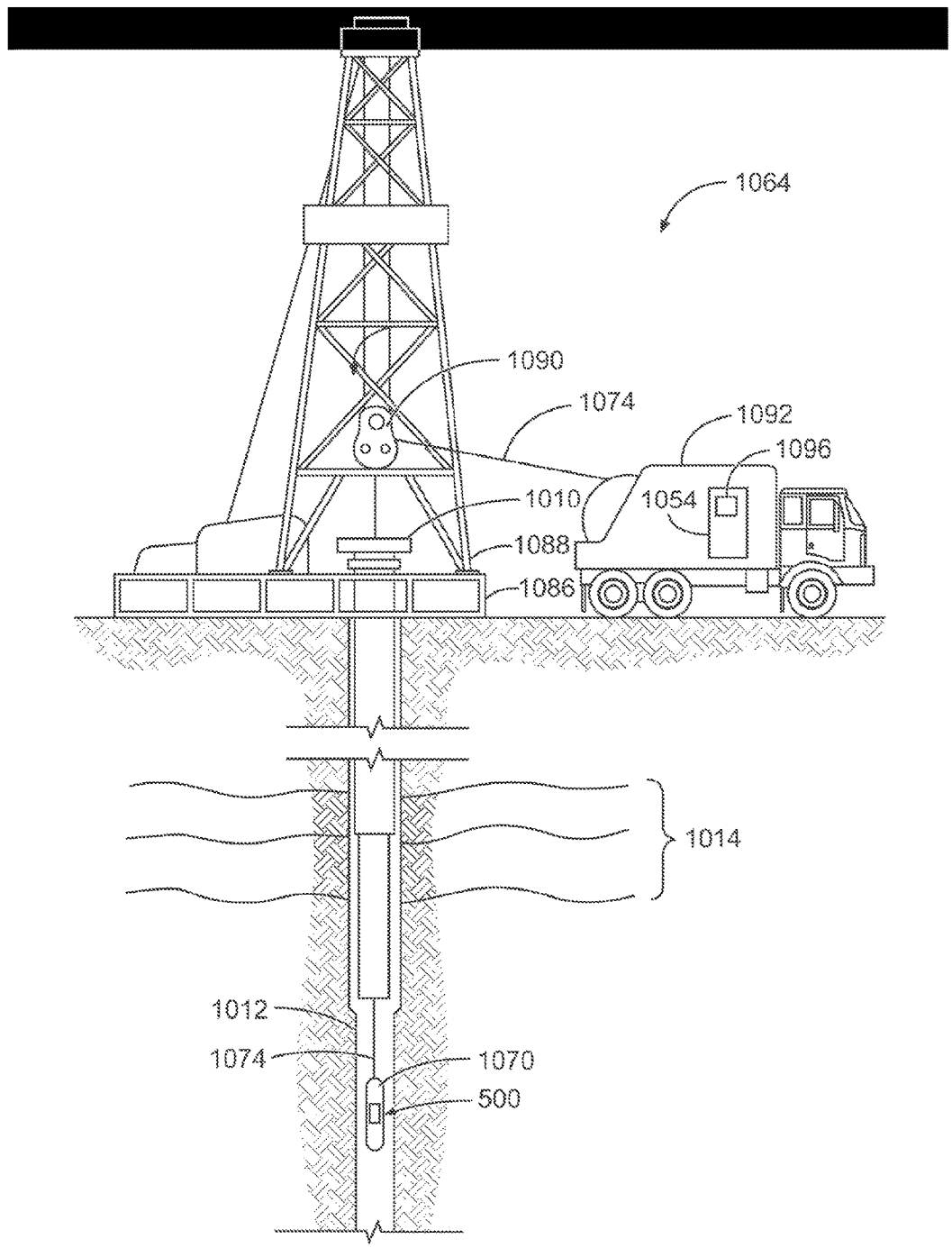
FIG. 10 illustrates a wireline system, according to various embodiments.
Figure 11:
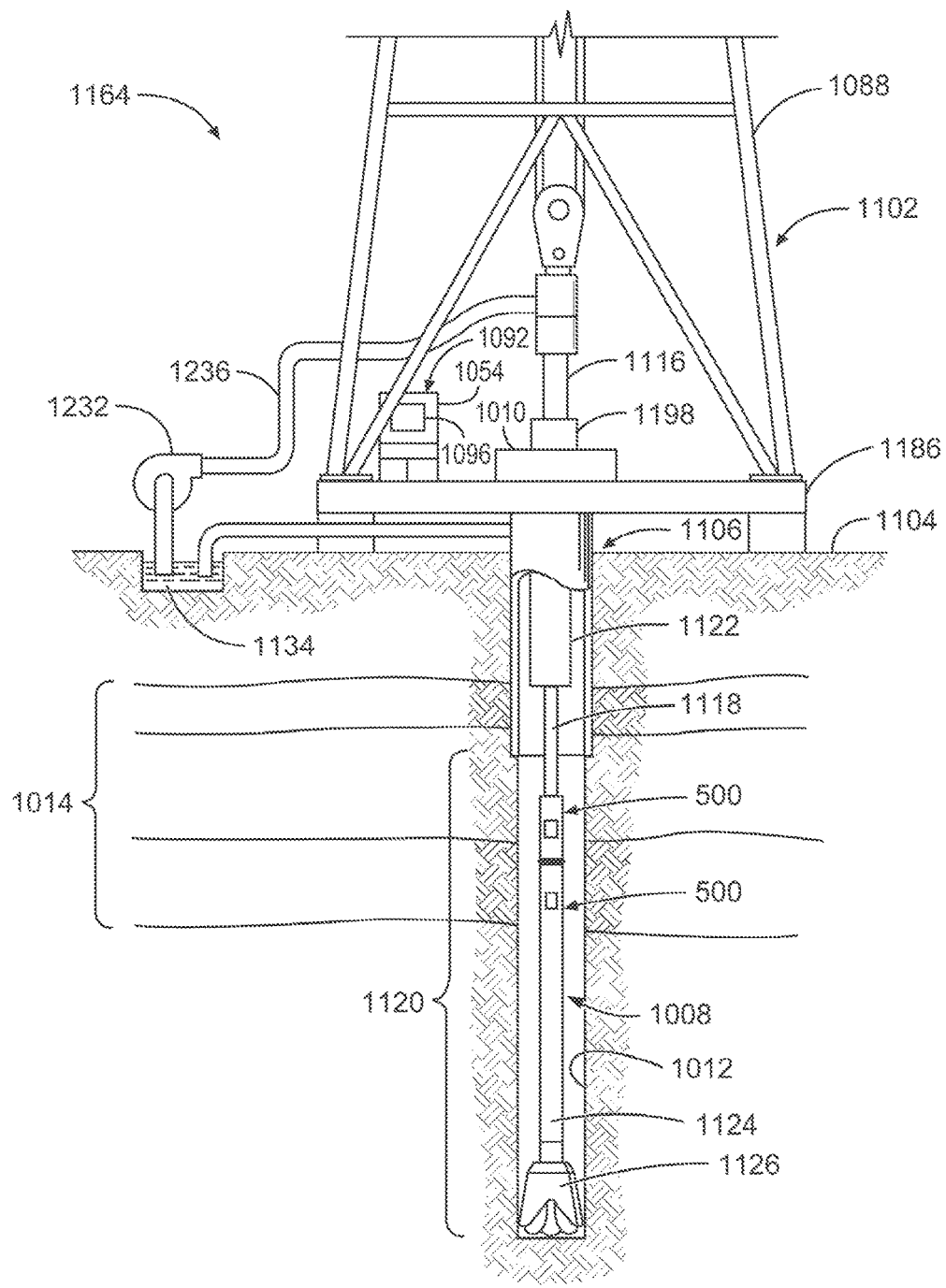
FIG. 11 illustrates a drilling rig system, according to various embodiments.

For example, FIG. 10 illustrates a wireline system, according to various embodiments. FIG. 11 illustrates a drilling rig system, according to various embodiments. Therefore, the systems 1064, 1164 may comprise portions of a wireline logging tool body 1070 as part of a wireline logging operation, or of a downhole tool 1124 as part of a downhole drilling operation. The systems 1064 arid 1164 may include any one or more elements of the apparatus 500 and systems 800 shown in FIGS. 1-10.

Thus, FIG. 10 shows a well during wireline logging operations. In this case, a drilling platform 1086 is equipped with a derrick 1088 that supports a hoist 1090.

Drilling oil and gas wells is commonly carried out using a string of drill pipes connected together so as to form a drilling string that is lowered through a rotary table 1010 into a wellbore or borehole 1012. Here it is assumed that the drilling string has been temporarily removed from the borehole 1012 to allow a wireline logging tool body 1070, such as a probe or sonde, to be lowered by wireline or logging cable 1074 into the borehole 1012. Typically, the wireline logging tool body 1070 is lowered to the bottom of the region of interest and subsequently pulled upward at a substantially constant speed.

During the upward trip, at a series of depths, various instruments included in the tool body 1070 may be used to perform measurements (e.g., made by sensors (e.g., transducer 310) attached to a tool shown in FIG. 3, or an array 506 forming part of the apparatus 500 shown in FIG. 5) on the subsurface geological formations 1014 adjacent the borehole 1012 (and the tool body 1070). The borehole 1012 may represent one or more offset wells, or a target well.

The measurement data can be communicated to a surface logging facility 1092 for processing, analysis, and/or storage. The logging facility 1092 may be provided with electronic equipment for various types of signal processing, which may be implemented by any one or more of the components of the system 800 in FIG. 8. Similar formation evaluation data may be gathered and analyzed during drilling operations (e.g., during logging while drilling operations, and by extension, sampling while drilling).

In sonic embodiments, the tool body 1070 is suspended in the wellbore by a wireline cable 1074 that connects the tool to a surface control unit (e.g., comprising a workstation 1054). The tool may be deployed in the borehole 1012 on coiled tubing, jointed drill pipe, hard wired drill pipe, or any other suitable deployment technique.

Turning now to FIG. 11, it can be seen how a system 1164 may also form a portion of a drilling rig 1102 located at the surface 1104 of a well 1106. The drilling rig 1102 may provide support for a drill string 1108. The drill string 1108 may operate to penetrate the rotary table 1010 for drilling the borehole 1012 through the subsurface formations 1014. The drill string 1108 may include a Kelly 1116, drill pipe 1118, and a bottom hole assembly 1120, perhaps located at the lower portion of the drill pipe 1118.

The bottom hole assembly 1120 may include drill collars 1122, a downhole tool 1124, and a drill bit 1126. The drill bit 1126 may operate to create the borehole 1012 by penetrating the surface 1104 and the subsurface formations 1014. The downhole tool 1124 may comprise any of a number of different types of tools including MWD tools, LWD tools, and others.

During drilling operations, the drill string 1108 (perhaps including the Kelly 1116, the drill pipe 1118, and the bottom hole assembly 1120) may be rotated by the rotary table 1010.

Although not shown, in addition to, or alternatively, the bottom hole assembly 1120 may also be rotated by a motor (e.g., a mud motor) that is located downhole. The drill collars 1122 may be used to add weight to the drill bit 1126. The drill collars 1122 may also operate to stiffen the bottom hole assembly 1120, allowing the bottom hole assembly 1120 to transfer the added weight to the drill bit 1126, and in turn, to assist the drill bit 1126 in penetrating the surface 1104 and subsurface formations 1014.

During drilling operations, a mud pump 1132 may pump drilling fluid (sometimes known by those of ordinary skill in the art as "mud") from a mud pit 1134 through a hose 1136 into the drill pipe 1118 and down to the drill bit 1126. The drilling fluid can flow out from the drill bit 1126 and be returned to the surface 1104 through an annular area between the drill pipe 1118 and the sides of the borehole 1012. The drilling fluid may then be returned to the mud pit 1134, where such fluid is filtered. In some embodiments, the drilling fluid can be used to cool the drill bit 1126, as well as to provide lubrication for the drill bit 1126 during drilling operations. Additionally, the drilling fluid may be used to remove subsurface formation cuttings created by operating the drill bit 1126.

In light of the foregoing discussion, it may be seen that in some embodiments, the system 1164 may include a drill collar 1122 and/or a downhole tool 1124 to house one or more systems 800, including some or all of the components thereof. Thus, for the purposes of this document, the term "housing" may include any one or more of a drill collar 1122, or a downhole tool 1124 (each having an outer wall, to enclose or attach to blades to which magnetometers, sensors, transducers, photon detectors, fluid sampling devices, pressure measurement devices, transmitters, receivers, fiber optic cable, acquisition and processing logic, and data acquisition systems, are attached). Many embodiments may thus be realized.

Thus, referring now to FIGS. 1-11, it may be seen that in some embodiments, the systems 1064, 1164 may include a drill collar 1122, as part a downhole tool 1124, and/or a wireline logging tool body 1070 to house one or more apparatus 500, similar to or identical to the apparatus 500 described above and illustrated in the figures. Any and all components of the system 800 shown in FIG. 8 may also be housed by the tool 1124 or the tool body 1070.

The tool 1124 may comprise a downhole tool, such as an LWD tool or art MWD tool. The wireline tool body 1070 may comprise a wireline logging tool, including a probe or sonde, for example, coupled to a logging cable 1074. Many embodiments may thus be realized, and a list of some of them follows.

In some embodiments, an apparatus comprises one or more arrays of X-ray detectors mechanically coupled to one or more collimators to determine standoff to a borehole based on photon activity measured by the array. The apparatus further comprises one or more ultrasonic transducers to measure a measured distance in mud in the borehole, and at least one processing unit to correct the measured distance to provide a corrected distance in the mud according to the standoff.

In some embodiments, the array of X-ray detectors comprises a complementary metal-oxide semiconductor (CMOS) material arranged in a pixelated format. In some embodiments, the array of X-ray detectors comprises a substantially linear arrangement of detector elements.

In some embodiments, the collimator comprises an array of tubes to direct photons engaged in the photon activity in the mud to the array of X-ray detectors, wherein each of the tubes are disposed at a substantially similar angle to the array of X-ray detectors.

In some embodiments, the apparatus further comprises at least some tubes in the collimator arranged in a substantially similar orientation to provide a plurality of different travel path lengths, as measured along an energy path created by a single source of energy, for photons associated with the photon activity and received by the array.

In some embodiments, the apparatus further comprises a source of energy to direct the energy into the mud, to generate the photon activity. In some embodiments, the source of energy comprises an X-ray tube.

In some embodiments, a system comprises a tubular member, and an array of X-ray detectors attached to the tubular member and mechanically coupled to a collimator to determine standoff to a borehole based on photon activity measured by the array. In some embodiments, the system further comprises an ultrasonic transducer to measure a measured distance in mud in the borehole, and a processing unit to correct the measured distance to provide a corrected distance according to the standoff. In some embodiments, the processing unit is used to determine the corrected distance based on energy loss due to beam spreading.

In some embodiments of the system, the tubular member comprises an ultrasonic logging tool. In sonic embodiments of the system, the tubular member comprises one of a wireline tool or a drilling tool.

In some embodiments, a method comprises determining downhole tool standoff using a nuclear tool and photon activity, and correcting acoustic measurements using the standoff.

In some embodiments of the method, correcting the acoustic measurements further comprises adjusting the acoustic measurements for beam spreading. In some embodiments of the method, using the nuclear tool further comprises measuring the photon activity using an array of photon detectors. In some embodiments of the method, measuring the photon activity further comprises calculating a ratio of the photon activity for adjacent ones of the photon detectors.

In some embodiments, the method further comprises determining a location of a layer boundary based on a change in the ratio. In some embodiments, the method further comprises determining thickness of the layer based on the location of the layer boundary.

In some embodiments, correcting the acoustic measurements further comprises adjusting a particular one of the acoustic measurements using the downhole tool standoff corresponding to the particular one of the acoustic measurements to provide an adjusted measurement; and repeating the adjusting for additional ones of the acoustic measurements.

Some embodiments of the method comprise directing energy comprising X-rays, using a source of the energy attached to the nuclear tool, into mud downhole; and determining the downhole tool standoff by counting Compton backscattering events associated with the photon activity created by interaction of the energy and the mud, wherein the events are monitored along an angle to the nuclear tool.

In some embodiments of the method, determining the downhole tool standoff further comprises averaging a plurality of standoff distances corresponding to a plurality of photon travel path lengths determined by a collimator mechanically coupled to an array of detectors in the nuclear tool.

After reading the information disclosed herein, those of ordinary skill in the art will realize that many other embodiments may be realized, but in the interest of brevity, these are not listed here.

In summary, the apparatus, systems, and methods disclosed herein can be used to calibrate ultrasonic tools using a combination of nuclear and ultrasonic logging data. A high resolution approach, with a single measurement provided by a nuclear device, can thus be used to determine ultrasonic transducer position downhole. This determination can be made in real time. Substituting the nuclear measurement for that of the mud transducer also serves to reduce errors introduced by the mud transducer, and errors that propagate to standoff transducer location measurements. Improved accuracy for cement impedance inversion, available regardless of whether LWD, wireline, or customer-supplied data are used, results, significantly enhancing the value of services provided by an operation/exploration company.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural arid logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the. Detailed Description, with each claim standing on its own as a separate embodiment.

What is claimed is:

1. An apparatus, comprising:
   an array of X-ray detectors mechanically coupled to a collimator to determine standoff to a borehole based on photon activity measured by the array;
   an ultrasonic transducer to measure a measured distance in mud in the borehole; and
   a processing unit to correct the measured distance to provide a corrected distance in the mud according to the standoff.

2. The apparatus according to claim 1, wherein the array of X-ray detectors comprises a complementary metal-oxide semiconductor material arranged in a pixelated format.

3. The apparatus according to claim 1, wherein the array of X-ray detectors comprises a substantially linear arrangement of detector elements.

4. The apparatus according to claim 1, wherein the collimator comprises an array of tubes to direct photons engaged in the photon activity in the mud to the array of X-ray detectors, and wherein each of the tubes are disposed at a substantially similar angle to the array of X-ray detectors.

5. The apparatus according to claim 1, further comprising:
   tubes in the collimator arranged in a substantially similar orientation to provide a plurality of different travel path lengths, as measured along an energy path created by a single source of energy, for photons associated with the photon activity and received by the array.

6. The apparatus according to claim 1, further comprising:
   a source of energy to direct the energy into the mud, to generate the photon activity.

7. The apparatus according to claim 6, wherein the source of energy comprises an X-ray tube.

8. A system, comprising:
   a tubular member;
   an array of X-ray detectors attached to the tubular member and mechanically coupled to a collimator to determine standoff to a borehole based on photon activity measured by the array;
   an ultrasonic transducer to measure a measured distance in mud in the borehole; and
   a processing unit to correct the measured distance to provide a corrected distance according to the standoff.

9. The system according to claim 8, wherein the tubular member comprises an ultrasonic logging tool.

10. The system according to claim 8, wherein the tubular member comprises one of a wireline tool or a drilling tool.

11. The system according to claim 8, wherein the processing unit is to determine the corrected distance based on energy loss due to beam spreading.

12. A method, comprising:
    determining downhole tool standoff using a nuclear tool and photon activity; and
    correcting acoustic measurements using the downhole tool standoff.

13. The method according to claim 12, wherein correcting the acoustic measurements further comprises:
    adjusting the acoustic measurements for beam spreading.

14. The method according to claim 12, wherein using the nuclear tool further comprises:
    measuring the photon activity using an array of photon detectors.

15. The method according to claim 14, wherein measuring the photon activity further comprises:
    calculating a ratio of the photon activity for adjacent ones of the photon detectors.

16. The method according to claim 15, further comprising:
    determining a location of a layer boundary based on a change in the ratio.

17. The method according to claim 16, further comprising:

determining thickness of the layer based on the location of the layer boundary.

18. The method according to claim 12, wherein correcting the acoustic measurements further comprises:
adjusting a particular one of the acoustic measurements using the downhole tool standoff corresponding to the particular one of the acoustic measurements to provide an adjusted measurement; and
repeating the adjusting for additional ones of the acoustic measurements.

19. The method according to claim 12 further comprising:
directing energy comprising X-rays, using a single source of the energy attached to the nuclear tool, into mud downhole; and
determining the downhole tool standoff by counting Compton backscattering events associated with the photon activity created by interaction of the energy and the mud, wherein the Compton backscattering events are monitored along an angle to the nuclear tool.

20. The method according to claim 12, wherein determining the downhole tool standoff further comprises:
averaging a plurality of standoff distances corresponding to a plurality of photon travel path lengths determined by a collimator mechanically coupled to an array of detectors in the nuclear tool.

* * * * *

UNITED STATES PATENT AND TRADEMARK OFFICE
CERTIFICATE OF CORRECTION

PATENT NO. : 10,012,762 B2
APPLICATION NO. : 15/113285
DATED : July 3, 2018
INVENTOR(S) : Zhijuan Zhang et al.

Page 1 of 1

It is certified that error appears in the above-identified patent and that said Letters Patent is hereby corrected as shown below:

In the Specification

In Column 4, Line 31, please replace "backscatterinig" with "backscattering"

Signed and Sealed this
Twenty-sixth Day of March, 2019

Andrei Iancu
*Director of the United States Patent and Trademark Office*